(12) United States Patent
Watanabe et al.

(10) Patent No.: US 6,453,556 B1
(45) Date of Patent: Sep. 24, 2002

(54) METHOD OF PRODUCING EXHAUST GAS VANE BLADE FOR SUPERCHARGERS OF MOTOR VEHICLES AND VANE BLADE

(75) Inventors: Takeshi Watanabe, Yasugi (JP); Toshimichi Matsukawa, Tokyo (JP)

(73) Assignee: HMY Ltd., Shimane (JP)

( * ) Notice: Subject to any disclaimer, the term of this patent is extended or adjusted under 35 U.S.C. 154(b) by 55 days.

(21) Appl. No.: 09/685,690

(22) Filed: Oct. 11, 2000

(51) Int. Cl.⁷ .............................................. F01D 17/16
(52) U.S. Cl. ...................... 29/889.7; 29/557; 415/160; 415/163; 415/164; 415/200
(58) Field of Search .................. 415/148, 159–165, 415/200; 29/557, 889.7; 72/339, 340, 356

(56) References Cited

U.S. PATENT DOCUMENTS

| | | | |
|---|---|---|---|
| 2,856,675 A | | 10/1958 | Hansen |
| 2,904,307 A | * | 9/1959 | Balje et al. ................. 415/163 |
| 3,582,231 A | * | 6/1971 | Zerlauth ..................... 415/160 |
| 3,680,381 A | * | 8/1972 | Portal ......................... 72/355.6 |
| 4,531,270 A | | 7/1985 | Griffith et al. |
| 4,659,295 A | * | 4/1987 | Burdette et al. ............ 415/164 |
| 4,905,637 A | | 3/1990 | Ott |
| 5,039,277 A | * | 8/1991 | Naudet ........................ 415/160 |
| 5,518,365 A | * | 5/1996 | Baets et al. ................. 415/160 |
| 6,050,775 A | * | 4/2000 | Erdmann et al. ........... 415/164 |

FOREIGN PATENT DOCUMENTS

| | | | |
|---|---|---|---|
| DE | 3516738 A1 | * 11/1986 | ................. 415/164 |
| FR | 563 345 | 12/1923 | |
| JP | 61-229976 A | * 10/1986 | ................. 415/163 |
| JP | 61-277887 | 12/1986 | |
| JP | 2-274342 | 11/1990 | |
| JP | 2000-64849 | 2/2000 | |
| NL | 48 180 | 11/1939 | |

OTHER PUBLICATIONS

Patent Abstract of JPX 2000–064849 Feb. 29, 2000.

* cited by examiner

*Primary Examiner*—Christopher Verdier
(74) *Attorney, Agent, or Firm*—Sughrue Mion, PLLC

(57) ABSTRACT

Disclosed is a producing method of an exhaust gas vane blade for superchargers of motor vehicles. The vane blade consists of a pivot part and a blade part with a streamlined section, which are integrally formed with each other. The vane blade is made of a heat resisting steel. The diameter of the pivot part is larger than the thickness of the blade part. The method comprises a multi-step cold-forging of a blank material of the above steel.

6 Claims, 2 Drawing Sheets

METHOD OF PRODUCING EXHAUST GAS VANE BLADE FOR SUPERCHARGERS OF MOTOR VEHICLES AND VANE BLADE

BACKGROUND OF THE INVENTION (1) Field of the Invention

The present invention relates to a producing method of an exhaust gas vane blade which is a component of superchargers for motor vehicles, and the vane blade.

(2) Description of the Related Art

A supercharger is a component of motor vehicles for improving the output performance of internal combustion engines using energy of discharged gas. By installing it in an engine, in comparison with the case without it, outstanding acceleration can be obtained within a revolutionary engine speed range from the middle to the high. In the supercharger of motor vehicles, a turbine wheel rotates at a high speed of not less than a hundred thousand revolutions per minute (rpm) by the energy of discharged gas fed into the supercharger to drive a compressor being co-axially mounted on the rotor shaft of the supercharger.

The vane blade is a component of superchargers, and it is caused to open and close in accordance with the engine speed thereby regulating the engine output. Especially, the engine output can be improved in a low engine speed range by the supercharger.

Since the vane blade opens and closes while being exposed to high temperature exhaust gas, it is essential that the vane blade has a good heat resistance property. Thus heat resisting steel is used therefor. Further, since a number of vane blades are disposed on the peripheral portion of the turbine wheel and they open and close at once, an accuracy of positional relationship between the pivot part and the blade part of the vane blade and an accuracy of a form of the blade part are important factors.

Therefore, conventionally, the vane blade has been formed by the lost wax precision casting process and the powder mold injection method (MIM) taking heat resistance property, a size and the form accuracy into consideration, and subsequently the cast or powder-molded product has been subjected to the process of finish machining of the pivot part, grinding and so on.

Regarding vane blades of superchargers used at a relatively low temperature range, they have been produced from an aluminum alloy by forging. For example, there is proposed in JP-A-61-277877 that a vane holder and a vane are integrally forged from a wrought aluminum alloy so that the both parts can have improved strength and be produced easily. Although this proposal is appreciated on the point that there is no bonding portion, a problem of inferior heat resistance property can not be solved.

The above-mentioned methods of the lost wax precision casting and the MIM are advantageous with respect to forming of a vane blade. But, in the case of integrally forming the pivot part and the blade part thereof, in a state as cast or sintered, since accuracy of a positional relationship between the pivot part and the blade part and a diameter of the pivot part do not satisfy the required levels, respectively, due to thermal strain occurred in the product during the casting or sintering process, it is necessary for the pivot part as cast or sintered to machine or grind resulting in an increase of production cost.

Further, in the lost wax precision casting process, since cast products are liable to have surface and inner defects, there is also a problem of a further cost increase for selecting sound products in order to ensure the product quality.

In the MIM, since green compacts are sintered, there is a problem that material strength of sintered products is lower than a usual wrought steel or a cast product, particularly, the transitional part between the blade part and the pivot part lacks needed strength.

Further, although a method of producing a vane blade by forging an aluminum alloy has been known, it has been hitherto out of thought of a person skilled in the art to produce a vane blade from heat resisting steel, taking account of a comparatively lesser need for mass production of vane blades in the past.

SUMMARY OF THE INVENTION

An object of the present invention is to omit or simplify finish working of pivot parts of vane blades in order to stably produce a large number of the vane blades for exhaust gas.

Another object of the invention is to provide a producing method of vane blades for exhaust gas and the product vane blades, according to which there will not occur problems of casting defects and lack of material strength.

The present inventors have studied the problems of material strength and mass-productivity, found out that the productivity and the production cost can be greatly improved by adopting a method of punching a flat plate of a heat resisting steel followed by simultaneously cold-forging a blade part and a pivot part, and reached the present invention. They have found out also that the accuracy of the exhaust gas vane blade can be ensured by a finish working process which includes a trimming press working and a simple finish working.

Thus, according to one aspect of the present invention, there is provided a producing method of an exhaust gas vane blade for superchargers of motor vehicles, the vane blade consisting of a pivot part and a blade part with a streamlined section, which are integrally formed with each other, and being made of a heat resisting steel, wherein the method comprises a first step of punching a flat plate of the heat resisting steel, and a subsequent multi-step cold-forging, and wherein the diameter of the pivot part is larger than the thickness of. the blade part.

Preferably, in a first step of the cold forging, a generally T-shaped piece or a cross shaped piece, having a geometric form and an area corresponding to the projection of the product vane blade, is produced by punching. Alternatively, the T-shaped piece or the cross shaped piece may be made from a circular or rectangular bar material, a material wrought by drawing and so on.

According to one feature of the invention, the cold forging includes a step of forging the blade part and the pivot part simultaneously. Preferably, progressive dies are used in the cold forging to ensure a high mass-productivity.

According to another feature of the invention, the cold forging comprises trimming press working at a final step, by which a flash of the work is removed and sizing of the work is effected whereby the dimensional accuracy is ensured.

According to another aspect of the invention, there is provided an exhaust gas vane blade for superchargers of motor vehicles, consisting of a pivot part and a blade part with a streamlined section, which are integrally formed with each other by cold forging, and being made of a heat resisting steel, the pivot part is substantially as forged.

As described above, a key feature of the invention is to produce the vane blade from a heat resisting steel by cold forging optionally comprising trimming press working. It is also an important feature that the blade part and the pivot part are forged simultaneously in the cold forging process.

According to the cold forging, the stability of quality is improved in comparison with the conventional lost wax precision casting process or the MIM. That is, the cold forging is a stable method and the forged product has no defects by casting or by powder injection molding. Further advantages of the invention method are that the cold forged product has high strength and there will occur no damage due to the above mentioned defects.

With regard to the heat resisting steel, it is advantageous to use a plate of heat resisting steel specified in JIS G 4312, which is relatively common and has good ductility, in view of cost and workability. If a number of T-shaped or cross-shaped pieces are produced simultaneously from the above steel plate by punching press working, the productivity is improved. The productivity can be further improved by using progressive dies in cold forging.

It is possible to remove a flash, which is produced during cold forging, and ensure the dimensional accuracy of the tip end of the vane blade by effecting trimming press working at a final step of cold forging. Further, a fine flash can be removed by additional barrel polishing.

DETAILED DESCRIPTION OF THE PREFERRED EMBODIMENTS

Figure 1:
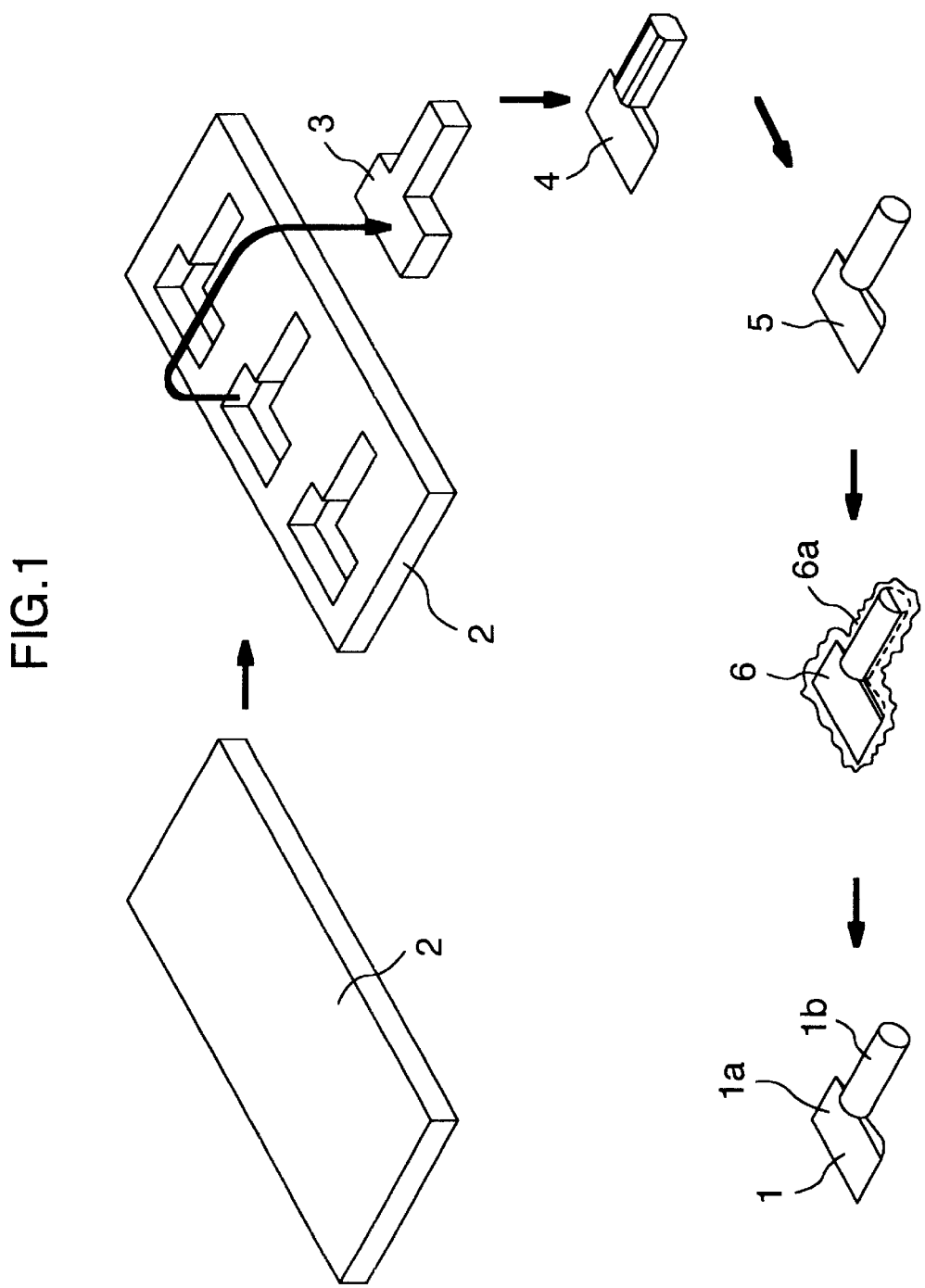
FIG. 1 is a flow diagram showing an embodiment of the present invention.

Hereafter, referring to the drawings, embodiments of the present invention will be described in detail. Herein, while the term of "press" or "pressing" is used in order to clearly show the working process, it is a part of the cold forging process.

FIG. 1 is a flow diagram showing a producing method of an exhaust gas vane blade 1 by punching and cold forging.

The product vane blade 1 consists of a blade part 1a which has a blade surface size of 20 mm×7.5 mm and a maximum thickness of 2.5 mm, and a pivot part 1b which has a diameter of 4.5 mm and a length of 13 mm. A heat resisting steel plate 2 was prepared as the blank material plate which is made of SUS 310S defined in JIS 4312.

Now, a description will be provided referring to the flow diagram.

First, T-shaped pieces 3, as a blank cold-forging material for exhaust gas vane blades, were produced from the heat resisting steel plate 2 by punching. In this case, although the flow diagram shows that three T-shaped pieces are produced by punching from the single plate 2, it is desirable to simultaneously produce a number of the T-shaped pieces by punching taking the capacity of automatic production into consideration.

Next, the cold forging was carried out with utilization of cold-forging dies (not shown). In this example, the cold forging process consisted of four steps while preparing four sets of forging dies. A first step was of roughly pressing for primarily forging the blade part 4. A second step was of roughly pressing for primarily forging the pivot part 5. Third and fourth steps were of pressing the work as a whole to obtain a final form, in which both of the blade part 4 and the pivot part 5 were simultaneously forged with utilization of totally-forging dies.

In each pressing step, while there is a problem that the thickness of a forged pivot part is liable to vary so as to become smaller longitudinally from the free end toward the side of the blade part due to a big difference in thickness between the blade part and the pivot part, it was corrected by providing a taper to the die cavity for forming the pivot part so as to have a cavity shape such that the diameter of the pivot part increases toward the side of the blade part.

In order to further simplify the above process, that is, reducing the number of forging steps, it is effective to provide in advance to the blank forging material with a thickness difference between the blade part and the pivot part.

An intermediate product 6 with a flash 6a, which was produced by the above four cold-forging steps, was subjected to trimming press working in order to remove the flash 6a. Subsequently, small flashes at end edges of the blade part and the pivot part were removed by barrel polishing to obtain an exhaust gas vane blade 1. The thus obtained vane blade 1 is optionally subjected to a slight finish treatment of polishing or grinding.

Figure 2:
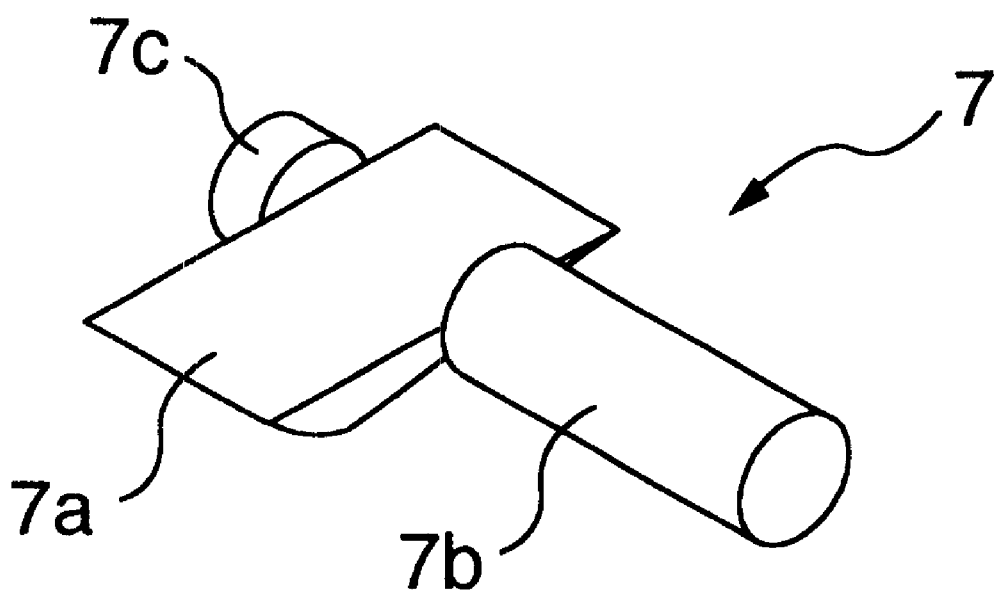
FIG. 2 shows a cross type vane blade as one embodiment of the invention, which is distinguished from the T-shaped vane blade shown in FIG. 1.

FIG. 2 shows an alternative cross-type vane blade 7 which consists of two coaxial pivot parts 7b, 7c and a blade part 7a, and which can be produced by the same process as the case of T-shaped vane blades described above.

It was confirmed that, according to the invention, the vane blade can be produced by cold forging while omitting a finishing process such as machining or polishing of the pivot part, which has satisfactory material strength and is free from surface and inner defects.

In manufacturing the exhaust gas vane blade, according to the producing method of the invention, the following advantages can be obtained:

(1) an automatic production process can be realized easily;

(2) the quality of products is stable;

(3) a finishing process can be omitted; and (4) it is possible to remarkably improve the productivity and manufacturing cost by the reasons stated in above Items (1) to (3), so that the present invention can contribute to practicing mass-production of exhaust gas vane blades.

What is claimed is:

1. A producing method of an exhaust gas vane blade for superchargers of motor vehicles, the vane blade consisting of a pivot part and a blade part with a streamlined section, which are integrally formed with each other, and being made of a heat resisting steel, wherein the method comprises a first step of punching a flat plate of the heat resisting steel; and a subsequent multi-step cold-forging, and wherein the diameter of the pivot part is larger than the thickness of the blade part.

2. A method according to claim 1, wherein a generally T- or cross-shaped piece is obtained by punching in the first step, which has a geometric form and an area corresponding to the projection of the product vane blade.

3. A method according to claim 1, wherein the cold forging includes a step of forging the blade part and the pivot part simultaneously.

4. A method according to claim 1, wherein the cold forging comprises trimming press working at a final step, by which a flash of the work is removed and sizing of the work is effected, whereby the dimensional accuracy is ensured.

5. A method according to claim 2, wherein the cold forging comprises trimming press working at a final step, by which a flash of the work is removed and sizing of the work is effected, whereby the dimensional accuracy is ensured.

6. A method according to claim 3, wherein the cold forging comprises trimming press working at a final step, by which a flash of the work is removed and sizing of the work is effected, whereby the dimensional accuracy is ensured.

* * * * *